United States Patent [19]

Chan

[11] Patent Number: 4,468,756
[45] Date of Patent: Aug. 28, 1984

[54] METHOD AND APPARATUS FOR PROCESSING LANGUAGES

[75] Inventor: Yim F. Chan, Wilmington, Del.

[73] Assignee: Chan Computer Corporation, Newark, Del.

[21] Appl. No.: 380,244

[22] Filed: May 20, 1982

[51] Int. Cl.³ .......................................... G06F 15/38
[52] U.S. Cl. ................................................... 364/900
[58] Field of Search ... 364/200 MS File, 900 MS File, 364/300

[56] References Cited

U.S. PATENT DOCUMENTS

| | | | |
|---|---|---|---|
| 1,028,165 | 6/1912 | Weber-Bell | 73/645 |
| 1,329,896 | 2/1920 | Frome | 434/157 |
| 1,609,959 | 12/1926 | Prescott | 434/157 |
| 2,412,061 | 12/1946 | Quidas | 35/35 |
| 2,627,541 | 2/1953 | Miller | 175/183 |
| 2,643,286 | 6/1953 | Hurvitz | 175/183 |
| 2,672,512 | 3/1954 | Mathes | 179/1.5 |
| 2,777,901 | 1/1957 | Dostert | 179/100.2 |
| 2,926,217 | 2/1960 | Powell | 179/15 |
| 3,020,360 | 2/1962 | Gratian et al. | 179/100.2 |
| 3,280,937 | 10/1966 | Faber, Jr. et al. | 181/0.5 |
| 3,284,084 | 11/1966 | Cooper | 274/11 |
| 3,289,325 | 12/1966 | Shreck | 35/35 |
| 3,319,357 | 5/1967 | Shreck et al. | 35/35 |
| 3,612,676 | 10/1971 | Ooba et al. | 353/27 |
| 3,703,602 | 11/1972 | Shenshev | 35/35 C |
| 3,958,345 | 5/1976 | Contreras | 35/35 H |
| 4,051,606 | 10/1977 | Tozo | 35/35 C |
| 4,086,435 | 4/1978 | Graupe et al. | 179/1.5 R |
| 4,124,895 | 11/1978 | Takise et al. | 364/514 |
| 4,158,236 | 6/1979 | Levy | 364/900 |
| 4,193,119 | 3/1980 | Arase et al. | 364/900 |
| 4,218,760 | 8/1980 | Levy | 364/900 |
| 4,245,405 | 1/1981 | Lien et al. | 434/178 |

OTHER PUBLICATIONS

Doddington and Schalk, "Speech Recognition: Turning Theory to Practice", Sep. 1981, IEEE *Spectrum*, pp. 26–32.

Elphick, "Unraveling the Mysteries of Speech Recognition", Mar./Apr. 1982, *High Technology*, pp. 71–78.

News Article: "Chinese Characters sent by U.S.-Made Telex Board", Nov. 1981, *American Business*, p. 19.

*Primary Examiner*—Raulfe B. Zache
*Attorney, Agent, or Firm*—Steele, Gould & Fried

[57] ABSTRACT

A method for processing a spoken language of substantially monosyllabic words corresponding to individual, transcribable character codes of complex configuration, comprising the steps of: compiling a first, machine-readable library file of encoded signals for each of the words as spoken; compiling a second, machine-readable library file of those of the character codes uniquely corresponding to one of the spoken words and homonym set identifying codes for groups of those of the character codes corresponding to the same spoken word, for each of the encoded signals in the first library file; compiling a third, machine-readable library file of sets of homonyms for each of the homonym set identifying codes in the second library file; sequentially converting spoken words into the encoded signals, utilizing the first library file; sequentially displaying the information in the second library file corresponding to the encoded signal corresponding to the sequentially converted spoken word; and, if the displayed information is one of the homonym set identifying codes, displaying the set of homonyms from the third library file corresponding to the displayed homonym set identifying code, whereby the correct transcribable character code for each spoken word may be easily and quickly identified.

An apparatus for processing a spoken language of substantially monosyllabic words corresponding to individual, transcribable character codes of complex configuration, comprising: a first, machine-readable library file for storing and encoded signal for each spoken word; a second, machine-readable library file for storing those of the character codes uniquely corresponding to one of the spoken words and homonym set identifying codes for groups of those of the character codes corresponding to the same spoken word, for each of the encoded signals in the first library file; a third, machine-readable library file for storing sets of homonyms for each of the homonym set identifying codes in the second library file; a converter for sequentially converting each of the spoken words into signals for accessing the encoded signals in the first library file; and, a display for the information from the second library file corresponding to the accessed encoded signal, and for further displaying set of homonyms, from the third library file, whereby the correct transcribable character code for each spoken word may be easily and quickly identified.

20 Claims, 4 Drawing Figures

METHOD AND APPARATUS FOR PROCESSING LANGUAGES

BACKGROUND OF THE INVENTION

1. Field of the Invention

This invention relates to a method and apparatus for processing a spoken language of words corresponding to individual, transcribable character codes of complex configuration, and in particular, to methods and apparatus for transcribing a spoken language of substantially monosyllabic words, such as the Chinese language, and for translating such languages into other languages.

2. Description of Prior Art

A number of Oriental languages are characterized by a character code of quite complex configuration. Moreover, the words of such languages may not be transcribed by combining a relatively small number of character codes into words by various combinations thereof. Rather, there is a unique transcribable character code of complex configuration for each word. Even plural forms, verb conjugation forms and noun declension forms can be represented by different character codes.

A good example of such an oriental language is Chinese. With respect to the transcription of Chinese, it should be noted that there is an Old and New Chinese. Old Chinese was utilized in what is referred to as Mainland China before approximately 1950, and it used today in Hong Kong, Taiwan, R.O.C. and some Malayan countries. New Chinese has been developed in what has become the People's Republic of China and used there since approximately 1950. Old Chinese is written in a very complicated character style whereas New Chinese is written in a somewhat simpler style. In Chinese, there are approximately 2,700 characters which might be characterized as basic characters, in general use. On an English typewriter, only 26 keys are actually required in order to transcribe most English words. Additional keys are provided for numbers, punctuation and other symbols, and of course each letter key provides for upper and lower case transcription. Nevertheless, if it were possible to have a Chinese typewriter, it would need approximately 100 times the number of keys found on an English typewriter. One would expect to encounter great difficulties in transcribing such a language, and moreover, in translating documents originally printed in such a language. This is the case, as can be appreciated from the following description of a Chinese "typewriter", which has been used in China for the past 20 years.

A Chinese typewriter is provided with a roller, mounted on a carriage, as in a typical English typewriter. The carriage is mounted so that a "typist" can push and pull the carriage forward and backward over a large square board, on a table comprising a lattice forming a very large number of small boxes. Elongated metal bars of small cross-section are disposed in the boxes of the lattice. A Chinese character is engraved at one end of each of the metal bars. A hammer device is also provided which can slide along the length of the carriage to any position of a needed character. When typing, a typist first reads a character and then positions the lattice to make the desired character available. The carriage is advanced and the hammer device is adjusted directly over the correct metal bar. The type then fixes the metal bar to the hammer, inks the character and enables a hammer strike to type the character on the page. The character is then returned to its original lattice position and the procedure is repeated for all of the remaining characters. It must be remembered that even the basic number of Chinese words requires approximately 2,700 individual metal bars. Such a number of metal bars is greater than that in a $50 \times 50$ array. A typist must have a certain educational background as well as mechanical skill and experience. The efficiency of such a typewriter is extremely low even for proficient operators.

In view of the difficulties encountered with state of the art typewriters, one skilled in the art might be expected to utilize computer assistance in the processing and transcription of languages such as Chinese. Computer assisted transcription entails overcoming three principal problems. The first problem involves the conversion of the complex character code into machine-readable information. The second problem involves the compilation, correlation and shuffling of information to provide a useful output. Finally, the useful output must be of a nature which can then be easily utilized for transcription, translation or other processing as required. Although the ability of computers to deal with almost any problem is generally accepted, the transcription and translation of Oriental languages presents a number of specific difficulties, both glaring and subtle, which have thus far prevented development of a satisfactory method and apparatus for such processing. Even where certain aspects of such processing have been developed in Western languages, such as English, the problems presented by the complex character codes of the Oriental languages are such that "Western" approaches are not only unsatisfactory, but provide little useful guidance.

Language as written and spoken is represented in a variety of ways. Marks on paper are interpreted as standing for sounds as well as "meanings". Sounds, written characters, meanings and the like can be cataloged and represented by machine code, according to any scheme. The present invention seeks to provide a means and method of cataloging sounds and written symbols in corresponding machine files, preferably together with other sounds and symbols having similar meaning in another language. Using encoding of acoustic information, the complexity of a large number of written character symbols is handled efficiently by data processing. Given the fact that the same sound may correspond to multiple characters and to multiple meanings, the user resolves any choices of plural meanings, by indicating the one desired. In this manner, the user accomplishes so much of the speech to character to meaning correlation as cannot be done by machine. The machine accomplishes repetitive comparisons and data shuffling at high speed, as cannot be done by a person. The man and machine therefore combine capabilities to form the optimum speech to character transcriber and/or translator.

The various approaches which have been taken in connection with the different aspects of this problem are illustrated in the following listed references, each of which is a U.S. patent: U.S. Pat. Nos. 1,028,165—Weber-Bell; 1,329,896—Frome; 1,609,959—Prescott; 2,412,061—Quidas; 2,627,541—Miller; 2,643,286—Hurvitz; 2,672,512—Mathes; 2,777,901—Dostert; 2,926,217—Powell; 3,020,360—Gratian et al; 3,280,937—Faber, Jr. et al; 3,284,084—Cooper; 3,289,325—Shreck; 3,319,357—Shreck et al; 3,612,676—Ooba et al; 3,958,345—Contreras;

3,703,602—Tozo; 4,086,435 Graupe et al; 4,124,895—Takise et al; 4,158,236—Levy; 4,218,760—Levy; and, 4,245,405—Lien et al. Acoustic discriminators range from simple resonance devices such as that disclosed in U.S. Pat. No. 1,028,165, to sophisticated acoustic analyzers such as that disclosed in U.S. Pat. No. 2,672,512 and synthesizers as disclosed in U.S. Pat. No. 3,703,602. A number of dictionary devices are disclosed wherein means are provided to match written and/or acoustic information in one or more languages. These range from simple mechanical devices, such as that disclosed in U.S. Pat. No. 1,329,896, to complex mechanical devices such as that disclosed in U.S. Pat. No. 3,020,360 and sophisticated digital devices such as those disclosed in U.S. Pat. Nos. 4,158,236 and 4,218,760. Finally, U.S. Pat. No. 4,051,606 discloses a self-learning apparatus for reading and writing the Japanese language. The device operates on the basis of monosyllabic kana-letters. The device is entirely syllabic and one or more syllables may be required to represent a word in Japanese. An acoustic discriminator, digitizer and memory are used to match an acoustic signal with a kana-letter to be typed. A user can compare his or her pronunciation to the "correct" pronunciation by noting whether the intended kana-letter is in fact printed by the machine.

In addition to patent references, articles in three periodicals may be noted. In the September, 1981 issue of the IEEE Spectrum is an article entitled *Speech Recognition: Turning Theory to Practice*, which discusses the extent to which advances in semi-conductor technology have facilitated electronic speech recognition. An article in the 1979 issue *China Pictorial* describes the method by which an engineer in Shanghai, China developed a method for encoding Chinese characters into a computer. His method consisted of dividing each character into four quadrants and assigning each quadrant a letter, in accordance with a coding scheme. This approach destroys the integrity, exactness, pronunciation and meaning of the character information and results in a veritable avalanche of difficulties as the vocabulary increases. It will also be apparent that such encoding of various parts of a character field relate to only a very small part of the overall problem of processing speech into written information. An article entitled Unraveling the Mysteries of Speech Recognition in the March/April 1971 issue of HIGH TECHNOLOGY is of general interest.

Finally, there is a project, begun some time prior to June, 1978, wherein a translation was undertaken, from Chinese to English of a physics journal entitled *Physika Sinika*, from the People's Republic of China. In the process, it was first necessary to manually transfer each character in the Chinese text into a machine-readable code, a digitizing process requiring a binary code for every character. The digital data was then entered into the computer, which utilizes a grammar program and a vocabulary file to produce an English translation. The manual encoding required an inordinantly large number of people. Moreover, inasmuch as a translation was the desired result, numerous unnecessary encoding and decoding steps were necessarily done.

Thus far, the utilization of acoustic discriminators and speech analyzers has been directed to, or has required what might be referred to as near perfect pronunciation in the appropriate language. Without "perfect" or "standard" pronunciation, only a very small vocabulary can be encoded and dependably identified. This severely limits the use to which the device can be put and severely limits the number of people who can take part in the processing. Moreover, where Oriental languages have been particularly involved, those skilled in the art, working at what has always been the state of the art, have heretofore relied solely on a manual encoding of transcribed characters.

This invention enables computer assisted processing of Oriental languages on the basis of spoken words, and involves a process which can be initialized or programmed for any number of persons. It is believed that this invention would be particularly effective and efficient in processing the Cantonese dialect of Chinese.

SUMMARY OF THE INVENTION

It is an object of this invention to provide a method and apparatus for automatically processing spoken words into transcribed text.

It is another object of this invention to provide a method and apparatus for automatically translating a spoken language into a second language.

It is yet another object of this invention to provide a method and apparatus for automatically translating a spoken language into a second language, and automatically preparing a text of the spoken words in the second language.

It is yet another object of this invention to provide a method and apparatus for processing spoken languages, which is particularly adapted for use with languages substantially comprising monosyllabic words corresponding to individual, transcribable character codes of complex configuration.

It is yet another object of this invention to provide a method and apparatus for processing spoken oriental languages.

These and other objects are accomplished by a method for processing a spoken language of words corresponding to individual, transcribable character codes of complex configuration, comprising the steps of: compiling a machine-readable reference library having a first file of encoded signals for each of the words as spoken, a second file having an entry for each of the encoded signals in the first file, of: the character codes uniquely corresponding to one of the spoken words; and, homonym set identifying codes for any other of the characters codes corresponding to the same spoken word, and a third file of sets of homonyms for each of the homonym set identifying codes in the second file; sequentially processing spoken words into machine-readable codes and comparing the codes with the encoded signals in the first file; sequentially displaying the information in the second file corresponding to the encoded signal closest to the machine-readable code; and, if the displayed information is one of the homonym set identifying codes, displaying the set of homonyms from the third file corresponding to the displayed homonym set identifying code, whereby the correct transcribable character code for each spoken word may be easily and quickly identified. The method may further comprise the step of compiling a fourth file in the machine-readable library of a second set of transcribable character codes of a second language, corresponding to a translation for each of the character codes in the second file, whereby the spoken language may be easily translated into the second language.

These and other objects are also accomplished by an apparatus for processing a spoken language of words corresponding to individual, transcribable character codes of complex configuration, comprising: a machine-readable reference library having a first file for storing an encoded signal for each spoken word; a second file for storing an entry for each of the encoded signals in the first file, of: the character codes uniquely corresponding to one of the spoken words; and, homonym set identifying codes for any other of the character codes corresponding to the same spoken word, and a third file for storing sets of homonyms for each of the homonym set identifying codes in the second file; means for sequentially processing each of the spoken words into machine-readable codes for comparison with the encoded signals in the first library file; and, means for displaying information from the second file corresponding to the accessed encoded signal closest to the machine-readable code, and for further displaying one of the sets of homonyms from the third file, when necessary whereby the correct transcribable character code for each spoken word may be easily and quickly identified. The apparatus may further comprise a fourth file in the reference library for storing a second set of transcribable character codes of a second language corresponding to a translation for each character code, whereby the spoken words may be easily and quickly translated into a second language.

In both the method and apparatus, the machine-readable reference library of the first, second, third and fourth files may also be described as first, second, third and fourth individual, machine-readable reference library files.

Both the method and apparatus provide for automatically and sequentially transcribing the correctly identified character codes in order to provide texts of the spoken language or of the second language. Alternatively, both the method and apparatus provide for generating a command signal, corresponding to the correctly identified transcribable character code, for further processing.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

DETAILED DESCRIPTION OF THE PREFERRED EMBODIMENTS

Figure 1A:
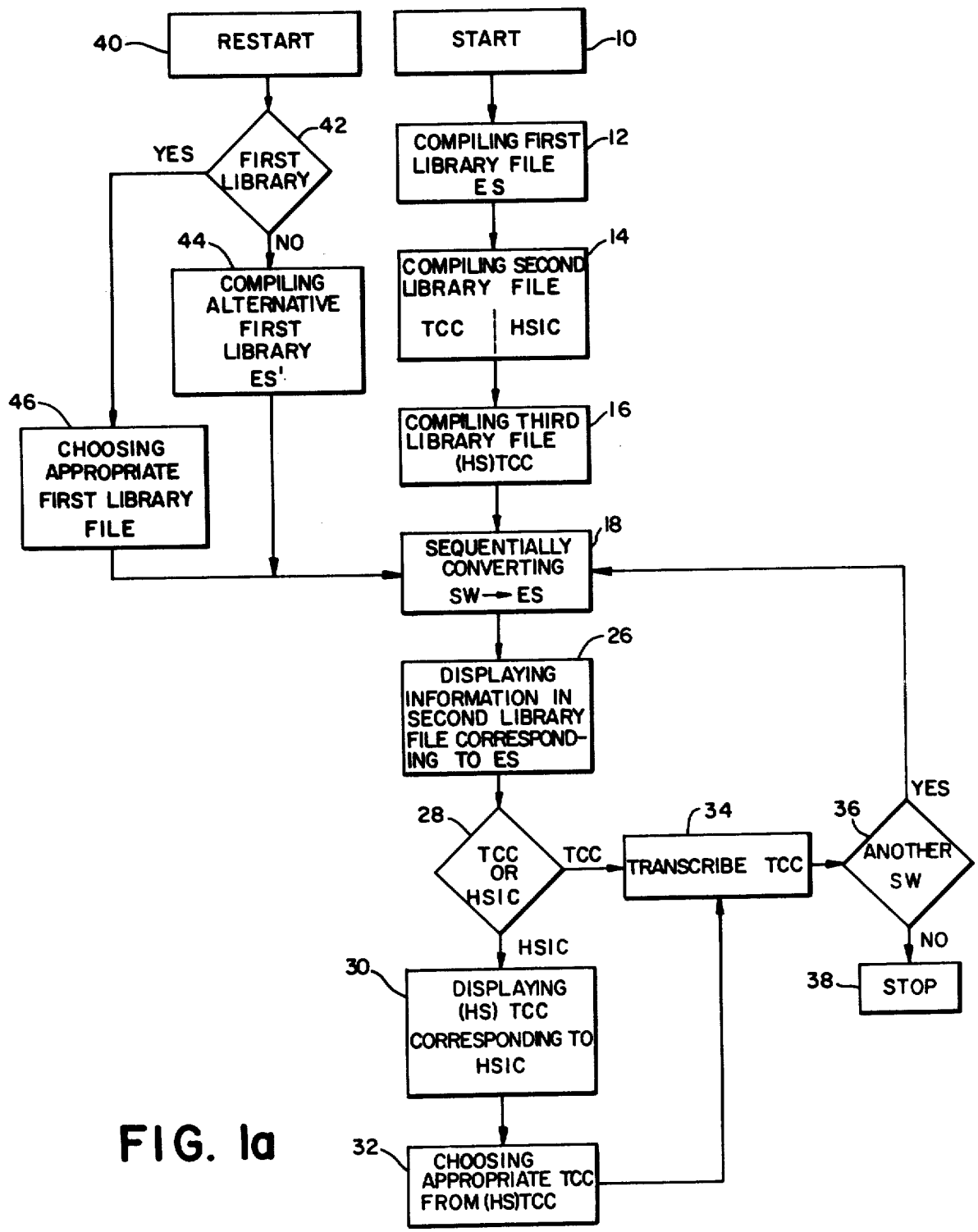
FIG. 1(a) is a flow chart illustrating a method for processing a spoken language aaccording to this invention.

A method for processing a spoken language, particularly one of substantially monosyllabic words corresponding to individual, transcribable character codes of complex configuration is illustrated in the flow chart of FIG. 1(a). Each of the blocks in the flow chart illustrates a step in the method or a decision which must be made as the steps are performed.

When performing the method according to this invention for the first time, the method begins at block 10, designated "START". The first step 12 is compiling a first, machine-readable library file of encoded signals (designated "ES" in the drawings) for each of the words as spoken. The first library file is custom prepared for a particular individual, for example by recording acoustical data as the person reads through a dictionary list, syllables, sounds or words. This automatically compensates for differences in pronunciation, accent and the like. It is necessary to compile a first file of encoded signals for each person practicing the method. The first file of encoded signals may also be thought of as an access or address code for information stored in a second, machine-readable library file. The files are ordered sets, organized to facilitate recovery of information from one of the files that corresponds to a piece of information in the other.

Compiling a second, machine-readable library file is the next step 14. The second library file contains two kinds of information. The first kind of information is a transcribable character code (designated "TCC" in the drawings) which uniquely correspond to one of the spoken words. As might be expected in any language, there are a number of spoken words which correspond to more than one transcribable character code. Such words are homonyms; that is, words having the same sound but a different written code and a different meaning. In the event that the spoken word corresponds to a word which can be classified as a homonym, the second library file contains a homonym set identifying code (designated "HSIC" in the drawings) instead of a transcribable character code. The transcribable character codes in the second library file are a useful end product, in and of themselves. The homonym set identifying codes may be thought of as access or address codes for a third, machine-readable library file of sets of homonyms. In Chinese, approximately 230 characters, among the approximately 2700 basic characters, are homonyms.

Compiling the third, machine-readable library file is the next step 16. There is a set of homonyms (designated "(HS)TCC" in the drawings) for each homonym set identifying code in the second library file. The number of homonyms in each set will of course depend upon the particular spoken word. The homonyms within each set will also be stored as transcribable character codes, although they will be accessed as groups, rather than individually as is the case in the second library file.

The first three compiling steps of the method may also be thought of as the single step of compiling a machine-based reference library, having a first file of encoded signals (ES) for each of the words as spoken, a second file having an entry for each of the encoded signals in the first file, of: the character codes uniquely corresponding to one of the spoken words (TCC); and, homonym set identifying codes (HSIC) for any other of the character codes corresponding to the same spoken word, and a third file of sets of homonyms ((HS)TCC) for each of the homonym set identifying codes (HSIC) in the second file.

After the reference library files have been compiled, the next step 18 is sequentially converting one or more spoken words (designated "SW" in the drawings) into the encoded signals (ES) utilizing information in the first file for comparison. The step 18 of sequentially converting spoken words into encoded signals will be more fully explained in connection with FIG. 1(c).

The next step 26 is sequentially displaying the information in the second library file corresponding to the encoded signal corresponding to the sequentially converted spoken word. As indicated in the decision block 28, the information so displayed will either be a transcribable character code (TCC) or a homonym set identifying code (HSIC). If a transcribable character code is displayed, the next step 34 can simply be transcribing the character code.

If, however, a homonym set identifying code is displayed, the next step 30 is to display the set of homonyms corresponding to the homonym set identifying code (HSIC). The set of homonyms ((HS)TCC) will contain at least two transcribable character codes, and as many as are necessary. After the set of homonyms has been displayed, the next step 32 is choosing the appropriate transcribable character code (TCC) from among those listed in the set of homonyms ((HS)TCC). After the appropriate transcribable character code has been chosen, it can then be transcribed as in step 34.

After the transcribable character code has been transcribed, decision block 36 requires a determination as to whether there are further spoken words (SW) to be transcribed. If there are further spoken words to be transcribed, the method returns to step 18 for sequentially converting the next spoken word into an encoded signal. If there are no further spoken words to be transcribed, the method may be terminated at the block 38, designated "STOP".

When practicing the method for a second or subsequent time, the method begins at block 40, designated "RESTART". Decision block 42 then requires a determination as to whether or not a first library file of encoded signals has already been compiled for the person speaking the words to be processed. If no such first library file exists, the next step 44 is compiling an alternative first library file of encoded signals (ES'). If a first library file for the particular individual has already been compiled, the next step 46 after decision step 42 is choosing the appropriate first library file. In either instance, after an appropriate first library file has been chosen, or after a alternative first library file has been compiled, the method proceeds with step 18 of sequentially converting the spoken words into encoded signals.

Figure 1B:
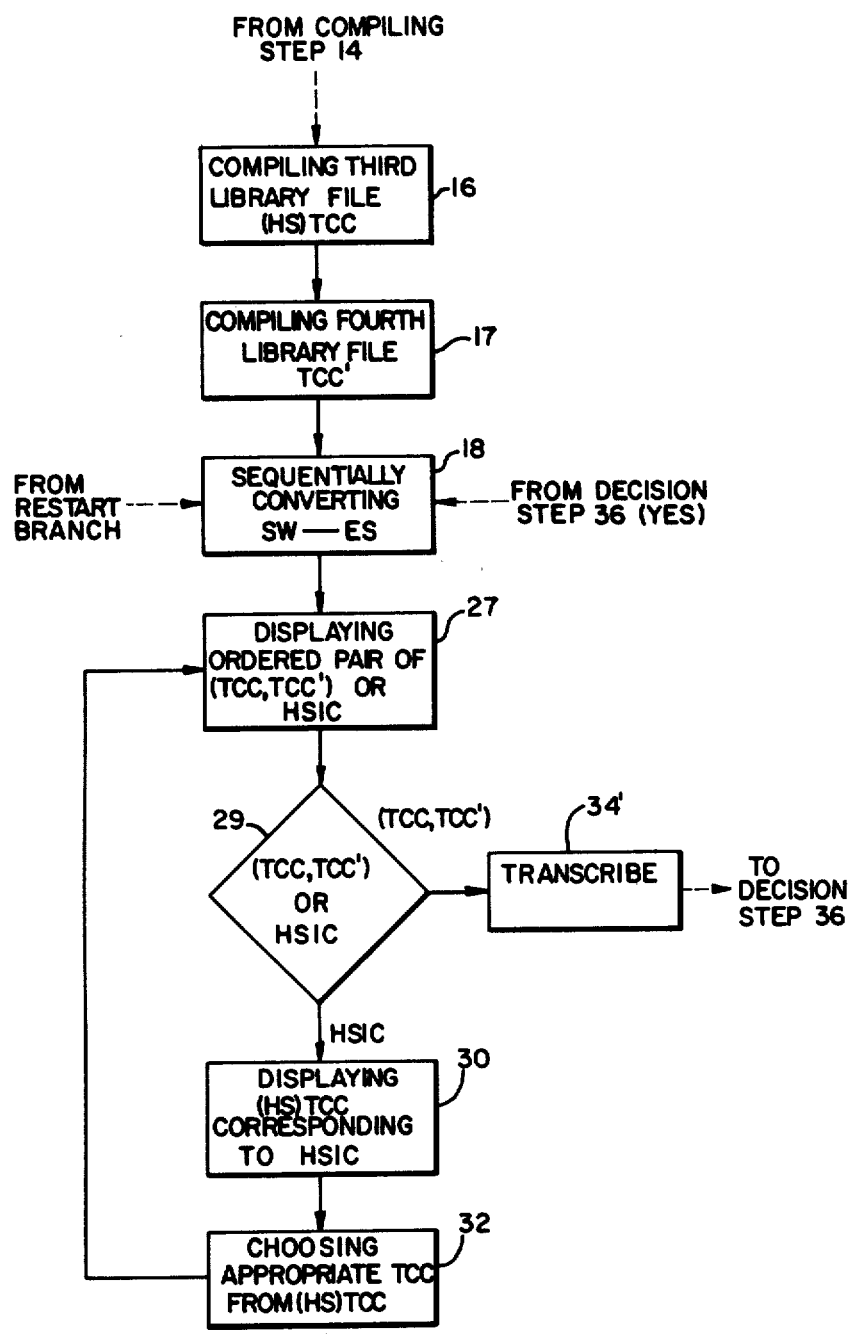
FIG. 1(b) is a portion of the flow chart shown in FIG. 1(a), as revised to illustrate a method for translating the spoken language.

A method according to this invention for translating the spoken language is illustrated by the flow chart in FIG. 1(b). This flow chart is not complete, as it is a variation of the flow chart shown in FIG. 1(a). Arrows drawn with dashed lines indicate where the steps represented by the flow chart of FIG. 1(b) fit into the method represented by the flow chart in FIG. 1(a).

After compiling the third, machine-readable library file of sets of homonyms in step 16, the next step 17 is compiling a fourth, machine-readable library file of transcribable character codes in a second language (designated "TCC'" in the drawings). The second set of transcribable character codes (TCC') corresponds to a translation for each of the transcribable character codes (TCC) in the second and third library files. Step 17 may also be thought of as compiling a fourth file in the general machine-readable reference library.

After compiling the fourth file of transcribable character codes in a second language, the next step is sequentially converting the spoken words into encoded signals as explained in connection with the basic flow chart in FIG. 1(a). The next step 27 is displaying information from the second and fourth library files. This information will be either an ordered pair consisting of the transcribable character code (TCC) of the spoken word in the spoken language and the transcribable character code of the translation thereof in the second language ((TCC, TCC')) or a homonym set identifying code (HSIC).

Decision block 29 requires a determination as to whether the ordered pair (TCC, TCC') or the homonym set identifying code (HSIC) is displayed. If the ordered pair of transcribable character codes is displayed then the transcribable character code in the second language can be transcribed in step 34'. If, however, a homonym set identifying code is displayed then the set of homonyms ((HS)TCC) from the third library file is displayed in step 30. After choosing the appropriate transcribable character code in the spoken language in step 32, the correct transcribable character code in the second language (TCC') can then be chosen from the fourth library file so as to be displayed with the first transcribable character code in an ordered pair in step 27. Decision block 29 would than reveal the desired ordered pair of transcribable character codes, enabling the transcribable character code in the second language to be transcribed in step 34'. In this manner, the spoken language may be easily translated into a second language. It will be appreciated that translation by this method is rough and required changes to suit grammar and idiom. Existing methods and computer programs can be applied at this stage in a straightforward fashion.

Figure 1C:
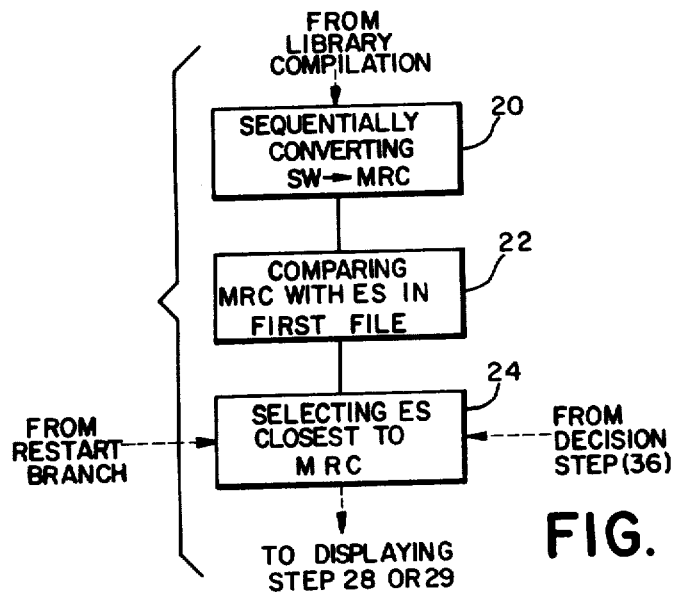
FIG. 1(c) is a portion of a flow chart which depicts the steps involved in sequentially converting the spoken words (SW) to the encoded signals (ES) in the first library file, corresponding to step-block 18 in FIGS. 1(a) and 1(b); and, FIG. 2 is a block diagram of an apparatus for processing a spoken language accordingly to this invention.

In the flow charts of both FIG. 1(a) and FIG. 1(b) the step 18 of sequentially converting the spoken words into encoded signals itself comprises a number of steps which are shown in more detail in a section of a flow chart shown in FIG. 1(c). After compilation of the reference library files, the spoken words (SW) are sequentially converted to a machine-readable code (designated "MRC" in the drawings) in step 20. The machine-readable code is then compared with the encoded signals (ES) in the first file in step 22. On the basis of the comparison, the encoded signal closest to the machine-readable code is selected in step 24 as that which is most likely to correspond to the spoken word. Alternatively, the machine readable code (MRC) can be used as an address code for the first library file of encoded signals (ES).

Although the method according to this invention for processing a spoken language requires less education and less training than previous methods, the nature of electrical acoustical analysis and digital processing is such that the correct encoded signal might not always be chosen, for any number of reasons. Accordingly, the displaying steps 28 or 29 are particularly useful for two reasons. One reason is to provide an opportunity for the reader or operator to confirm that the correct transcribable character code has been chosen, prior to transcription. The second reason is to provide an opportunity to deal with homonyms. In connection with translating the spoken language, it is also useful to be able to see the transcribable character codes of the spoken language and translation language respectively, prior to transcription.

Video display terminals are provided with internal memories or switching networks in which are stored the necessary information to display a particular symbol (letter, number, word, etc.) in response to a particular coded input. In this embodiment, the video display is programmed for Chinese characters, and the transcribable character code (TCC) represents an address code for the appropriate symbol (TCC or HSIC). It is the symbol which is printed, not the digital code. Printers may also be provided with internal memories or switching networks which enable a particular symbol to be transcribed in response to a particular coded input. The transcribable character code (TCC) provides an address code for the printer as well.

Although the method according to this invention for processing a spoken language has been described in terms of transcribing the spoken language, or transcribing a translation language, it is also contemplated that the method include generating a command signal, corresponding to the correctly identified transcribable character code (in either the spoken language, the translation language or both), for further processing other than transcription. Such further processing may include the compilation of further library files or the transmission of such information over data links. The methods according to this invention may also be used for instructional purposes, and in this event, transcription may be unnecessary.

It can be appreciated that the methods described herein provide a process whereby spoken words may be easily and quickly identified and/or translated into a second language and/or transcribed in either language. The method also provides for utilization by persons without high levels of education, skill, and clarity and conciseness of pronunciation.

Figure 2:
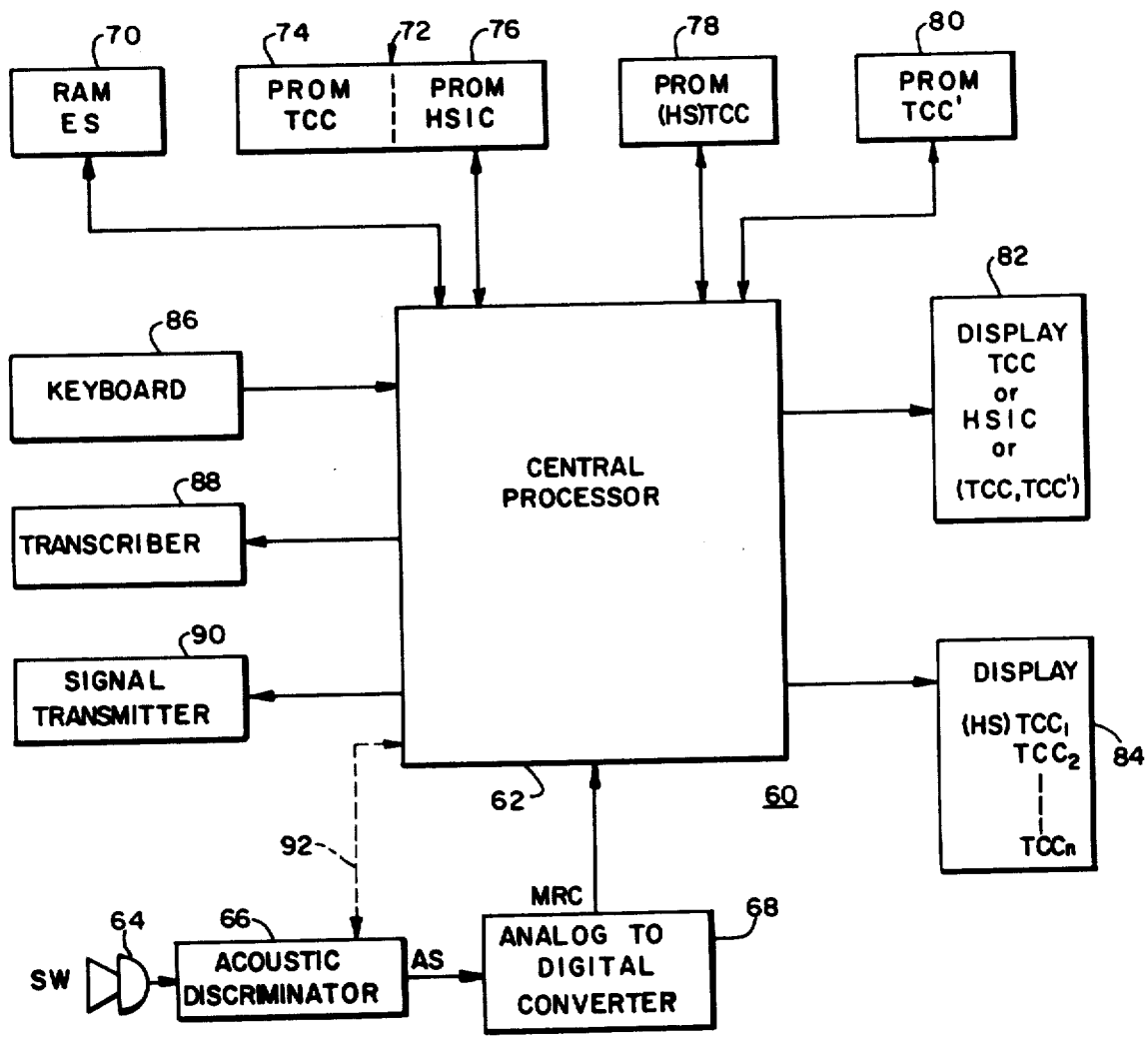

An apparatus for processing a spoken language according to this invention is shown in block diagram form in FIG. 2, and is generally designated 60. The apparatus 60 is generally illustrated as a digital computer. The operation of the various components of a digital computer are well known to those skilled in the art, and construction of an apparatus for processing a spoken language accordingly to this invention can be constructed from such components by those skilled in the art. One of the very significant advantages of the method and apparatus according to this invention is the ability to practice the method on an apparatus which can be constructed in accordance with existing hardware and state of the art in digital processing and computer programming. Accordingly, the particular manner in which each of the various components of the apparatus 60 operates does not form a part of this invention, in and of itself, and the operation thereof will not be described in detail. The heart of the apparatus 60 is a central processor 62. The primary function of the central processor 62 is to provide data communication between the various functional components of the apparatus and to execute comparisons and arithmetic operations as required.

Spoken words (SW) are received by a microphone 64. An acoustic discriminator 66, such as the more sophisticated of those described in the description of prior art herein is utilized to take measurements of relative intensities of a range of frequency components of the sounds of the spoken words at a plurality of sampling times. The output of the acoustic discriminator 66 is an analog signal (designated "AS" in the drawings). The analog signal forms an input to an analog to digital converter 68. The output of the analog to digital converter 68 is a machine-readable code (MRC) in digital form (e.g., binary code). The machine-readable code is used to access or address the random access memory 70 which forms the first library file of encoded signals (ES).

Once reference files are loaded, the operation is straightforward. Upon a word being spoken, a search of the file is conducted to find an entry having the same characteristics. When the entry is located, its sequence in the list or some other attribute is used to find the corresponding data stored in the next list. For an example in English, the user speaks "nine". The sound is encoded and the first file is searched for a similar entry. The similar entry is found to be the ninth entry. Referring to the ninth entry in the second file, data is found representing the written character "9", which is then displayed. Until a word is spoken which has a homonym, transcription proceeds. The processing can be made free-wheeling (i.e., all sounds received are transcribed) or can be made responsive to command/control inputs from the user or the central processor.

A custom random access memory 70 will be loaded to form a first file, compiled for each person utilizing or operating the apparatus. A programmable read only memory (PROM) 72 forms the second library file, and only one is required for all the users. The second library file comprises two parts 74 and 76 which may be thought of as separate programmable read only memories. Programmable read only memory portion 74 has the transcribable character codes (TCC) of those of the character codes uniquely corresponding to one of the spoken words. The second part 76 of the programmable read only memory has stored therein the homonym set identifying codes (HSIC) for any other of the character codes corresponding to the same spoken word. The encoded signals of the random access memory 70 may be thought of as an access or address code for the respective parts 74 and 76 of the programmable read only memory 72 because the information in the files corresponds. A programmable read only memory 78 is provided for storing the sets of homonyms ((HS)TCC) for each of the homonym set identifying codes in the part 76 of the programmable read only memory 72 because the information in the files corresponds. Each set of homonyms will comprise at least two transcribable character codes and as many as are required. This is depicted in the drawings as follows, "(HS)TCC$_1$, TCC$_2$, ... TCC$_n$". The homonym set identifying codes in programmable read only memory 72 may be thought of as access or address codes for programmable read only memory 78.

A programmable read only memory 80 is provided for storing the transcribable character codes of a second language (TCC'). Each of the transcribable character codes of the second language (TCC') corresponds to a translation for each of the transcribable character codes (TCC) stored in programmable read only memory 72 and programmable read only memory 78. The transcribable character codes (TCC) of the programmable read only memories 72 and 78 may be thought of as access or address codes for the programmable read only memory 80.

A first display means 82 is provided for displaying one of three kinds of information. Video display terminals are provided with internal memories or switching networks in which are stored in necessary information to display a particular symbol (letter, number, word, etc.) in response to a particular coded input. In this embodiment, video display is programmed for Chinese characters, and the transcribable character code (TCC) represents an address code for the appropriate symbol (TCC or HSIC). The term "TCC" is used in the display to represent the symbol. One kind of information will be a transcribable character code (TCC) from either programmable read only memory part 74 or programmable read only memory 78. A second kind of information would be a homonym set identifying code (HSIC) from programmable read only memory part 76. A third kind of information would be an ordered pair consisting of a transcribable character code from either programmable read only memory part 74 or programmable read only memory 78 and a transcribable character code in a second language from programmable read only memory 80 (TCC, TCC'). In those instances where the first display means 82 in fact displays a homonym set identifying code, a second display means 84 is provided for displaying the sets of homonyms from programmable read only memory 78. The display of the set of the homonyms on display means 84 can be triggered automatically upon display of a homonym set identifying code on the first display means 82. The correct transcribable character code can be chosen by manipulation of a keyboard 86. The keyboard 86 can also be utilized in connection with compiling the reference library files and inquiries as to whether a first library file has been compiled for a particular individual.

After the correct transcribable character code in the spoken language or in the translation language has been identified and displayed, a transcriber 88 can be utilized to prepare a text of the transcribable character code. Printers may also be provided with internal memories or switching networks which enable a particular symbol to be transcribed in response to a particular coded input. The transcribable character code (TCC) provides an address code for the printer as well. In the event that a transcription is not desired, a command signal corresponding to the correctly chosen transcribable character code can be generated, and transmitted by the signal transmitter 90 for further processing. The command signal can be, or can include the transcribable character code itself. The transcriber 88 and signal transmitter 90 may also be controlled by the keyboard 86.

The method embodied in the flow charts of FIGS. 1(a), 1(b) and 1(c) can be related to the apparatus shown in FIG. 2. Random access memory 70 and programmable read only memories 72, 74 (76 and 78) and 80 are utilized in the library compiling steps 12, 14, 16 and 17. Display means 82 and 84 are utilized in displaying stes 26, 27 and 30. First and second display means 82 and 84 may be separate video monitors or different portions of the same video monitor. Keyboard 88 is utilized in connection with decision step 42 and choosing steps 32 and 46. Transcriber 88 is utilized in connection with transcribing steps 34 and 34'. Microphone 64, acoustic discriminator 66 and analog to digital converter 68 are utilized in sequentially converting spoken words into encoded signals, encompassing steps 20, 22 and 24 (which are combined in step 18). The central processor bears on virtually all aspects of the method as well as on the interrelationship of nearly all of the functional components. For example, it is conceivable that the acoustic discriminator 66 would be controlled by the central processor 62, as shown by the dotted control line 92, for example by a central processor initiated sampling technique or by repetitive status checks. Alternatively the central processor could be called to task by the discriminator, for example using a system of priority interrupts.

It will be apparent that the basic idea of the invention can be embodied in numerous ways. For example, the PROMs can be replaced by RAM and re-load as required to change reference file information. Nonvolatile memory is nevertheless preferred. Skilled persons will also appreciate that the speed and vocabulary capabilities of the device will be subject to a trade off. A large vocabulary requires a large set of acoustic data points to uniquely identify each word. Comparisons involving a large number of data points, however, will be slow because each of the file entries must be compared and an algorithm executed to determine the "closest". The set of 2500 monosyllabic Chinese characters are believed within acceptable speed and memory space requirements.

This invention may be embodied in other specific forms without departing from the spirit or essential attributes thereof, and accordingly, reference should be made to the appended claims, rather than to the foregoing specification, as indicating the scope of the invention.

What is claimed is:

1. A method for processing a spokenk language of substantially monosyllabic words corresponding to individual, transcribable character codes of complex configuration, comprising the steps of:
   compiling a first, machine-readable library file of encoded signals for each of the words as spoken;
   compiling a second, machine-readable library file or those of the character codes uniquely corresponding to one of the spoken words and homonym set identifying codes for groups of those of the character codes corresponding to the same spoken word, for each of the encoded signals in the first library file;
   compiling a third, machine-readable library of sets of homonyms for each of the homonym set identifying codes in the second library file;
   sequentially converting spoken words into the encoded signals, utilizing the first library file;
   sequentially displaying the information in the second library file corresponding to the encoded signal corresponding to the sequentially converted spoken word; and, if the displayed information is one of the homonym set identifying codes,
   displaying the set of homonyms from the third library file corresponding to the displayed homonym set identifying code, whereby the correct transcribable character code for each spoken word may be easily and quickly identified.

2. The method of claim 1, further comprising the step of generating a command signal, corresponding to the correctly identified transcribable character code, for further processing.

3. The method of claim 2, further comprising the step of automatically and sequentially transcribing the correctly identified character codes in response to the command control signals.

4. The method of claims 1, 2 or 3, wherein the spoken words are sequentially converted into the encoded signals by the steps of:
   acoustically discriminating between the spoken words by measuring frequencies and relative intensities of components of the sounds as a function of time;
   generating analog signals corresponding to the measured frequencies and intensities; and,
   converting the analog signals into digital codes forming the encoded signals.

5. The method of claim 1, further comprising the step of:

compiling a fourth, machine-readable library file of a second set of transcribable character codes of a second language, corresponding to a translation for each of the character codes in the second library file, whereby the spoken language may be easily translated into the second language.

6. The method of claim 5, further comprising the step of: sequentially and automatically transcribing the translated words.

7. An apparatus for processing a spoken language of substantially monosyllabic words corresponding to individual, transcribable character codes of complex configuration, comprising:
a first, machine-readable library file for storing an encoded signal for each spoken word;
a second, machine-readable library file for storing those of the character codes uniquely corresponding to one of the spoken words and homonym set identifying codes for groups of those of the character codes corresponding to the same spoken word, for each of the encoded signals in the first library file;
a third, machine-readable library file for storing sets of homonyms for each of the homonym set identifying codes in the second library file;
means for sequentially converting each of the spoken words into signals for accessing the encoded signals in the first library file; and,
means for displaying information from the second library file corresponding to the accessed encoded signal, and for further displaying one of the sets of homonyms, from the third library file, whereby the correct transcribable character code for each spoken word may be easily and quickly identified.

8. The apparatus of claim 7, further comprising a fourth, machine-readable library file for storing a second set of transcribable character codes of a second language corresponding to a translation for each character code, whereby the spoken words may be easily and quickly translated into a second language.

9. The apparatus of claims 7 or 8, further comprising means for generating a command signal, corresponding to the correctly identified transcribable character code, for further processing.

10. The apparatus of claims 7 or 8, further comprising means for automatically and sequentially transcribing the correctly identified character codes.

11. A method for processing a spoken language of words corresponding to individual, transcribable character codes of complex configuration, comprising the steps of:
compiling a machine-readable reference library, having a first file of encoded signals for each of the words as spoken, a second file having an entry for each of the encoded signals in the first file, of: the character codes uniquely corresponding to one of the spoken words; and, homonym set identifying codes for any other of the character codes corresponding to the same spoken word, and a third file of sets of homonyms for each of the homonym set identifying codes in the second file;
sequentially processing spoken words into machine-readable codes and comparing the codes with the encoded signals in the first file;
sequentially displaying the information in the second file corresponding to the encoded signal closest to the machine-readable code; and, when the displayed information is one of the homonym set identifying codes,
displaying the set of homonyms from the third file corresponding to the displayed homonym set identifying code, whereby the correct transcribable character code for each spoken word may be easily and quickly identified.

12. The method of claim 11, further comprising the step of generating a command signal, corresponding to the correctly identified transcribable character code, for further processing.

13. The method of claim 12, further comprising the step of automatically and sequentially transcribing the correctly identified character codes in response to the command control signals, whereby the spoken words are easily converted into text.

14. The method of claims 11, 12 or 13, wherein the spoken words are sequentially processed into the encoded signals by the steps of:
acoustically discriminating between the spoken words by taking measurements of relative intensities of a range of frequency components of the sounds at a plurality of sampling times; and,
converting the measurements into digital codes.

15. The method of claim 11, further comprising the step of:
compiling a fourth file in the machine-readable library of a second set of transcribable character codes of a second language, corresponding to a translation for each of the character codes in the second file, whereby the spoken language may be easily translated into the second language.

16. The method of claim 15, further comprising the step of: sequentially and automatically transcribing the translated words.

17. An apparatus for processing a spoken language of words corresponding to individual, transcribable character codes of complex configuration, comprising:
a machine-readable reference library having a first file for storing an encoded signal for each spoken word; a second file for storing an entry for each of the encoded signals in the first file, of: the character codes uniquely corresponding to one of the spoken words; and, homonym set identifying codes for any other of the character codes corresponding to the same spoken word, and a third file for storing sets of homonyms for each of the homonym set identifying codes in the second file;
means for sequentially processing each of the spoken words into machine-readable codes for comparison with the encoded signals in the first library file; and,
means for displaying information from the second file corresponding to the accessed encoded signal closest to the machine-readable code, and for further displaying one of the sets of homonyms from the third file when necessary, whereby the correct transcribable character code for each spoken word may be easily and quickly identified.

18. The apparatus of claim 17, wherein the reference library has a fourth file for storing a second set of transcribable character codes corresponding to characters in a second language, the characters in the second language being translations of the data in the second file and the homonyms in the third file.

19. The apparatus of claims 17 or 18, further comprising means for generating a command signal, corresponding to the correctly identified transcribable character code, for further processing.

20. The apparatus of claims 17 or 18, further comprising means for automatically and sequentially transcribing the correctly identified character codes, whereby the spoken words may be easily converted into text.

* * * * *